United States Patent [19]

Guiffant et al.

[11] Patent Number: 4,974,152

[45] Date of Patent: Nov. 27, 1990

[54] INSERTED DEVICE FOR INDEPENDENTLY CONNECTING AUXILIARY STORAGE UNITS TO A DATA-PROCESSING ASSEMBLY

[76] Inventors: Yves Guiffant, 1 Avenue Jean Perrin, 92260 Fontenay-Aux-Roses; Claude Bourdon, 12 Les Chateaux Bruloir, 95000 Cergy; Michel Mestrallet, 7 Rue des Acacias, 91430 Igny, all of France

[21] Appl. No.: 49,474

[22] Filed: May 14, 1987

[30] Foreign Application Priority Data

May 15, 1986 [FR] France .................. 86 07000

[51] Int. Cl.⁵ .............................. G06F 3/00
[52] U.S. Cl. ....................... 364/200; 364/238.4;
364/248; 364/248.1; 364/248.2; 364/248.3;
364/248.4; 364/240.8; 364/243; 364/268;
364/268.9; 364/285; 364/285.3
[58] Field of Search ... 364/200 MS File, 900 MS File

[56] References Cited

U.S. PATENT DOCUMENTS

| | | |
|---|---|---|
| 4,007,448 | 2/1977 | Sergeant et al. . |
| 4,028,663 | 6/1977 | Royet et al. . |
| 4,089,028 | 5/1978 | Wells . |
| 4,161,778 | 7/1979 | Getson, Jr. et al. ............... 364/900 |
| 4,183,084 | 1/1980 | Lawson . |
| 4,203,154 | 5/1980 | Lampson et al. . |
| 4,215,400 | 7/1980 | Denko ............................. 364/200 |
| 4,374,436 | 2/1983 | Armstrong ........................ 364/900 |
| 4,380,052 | 4/1983 | Shima . |
| 4,660,169 | 4/1987 | Norgren et al. . |
| 4,674,085 | 6/1987 | Aranguren et al. .................. 370/85 |
| 4,719,622 | 1/1988 | Whipple et al. . |

OTHER PUBLICATIONS

Zimmerman et al., "New Interface Gives a Boost to 5.25-inch Winchesters", Electronic Design, Aug. 18, 1983, pp. 217-221.
Czernek, "Highest-Capacity 8-in. Drive Persents Choice of Interfaces", Electronic Design, Nov. 15, 1984, pp. 271-278.

Primary Examiner—Gareth D. Shaw
Assistant Examiner—Rebecca L. Rudolph
Attorney, Agent, or Firm—Mason, Fenwick & Lawrence

[57] ABSTRACT

An inserted device for connecting auxiliary storage units (2) to a data-processing assembly, the units being connected on the one hand by a daisy-chain control cable A connecting the storage units (2) to one another and to the data-processing assembly, inter alia to at least one auxiliary storage unit controller (3), and on the other hand by high transmission-speed star cables B, characterized in that it comprises means for disconnecting and connecting each auxiliary storage unit (2) in the data-processing assembly without interfering with the operation of the other auxiliary storage units (2), inter alia those connected to the same controller (3).

16 Claims, 3 Drawing Sheets

INSERTED DEVICE FOR INDEPENDENTLY CONNECTING AUXILIARY STORAGE UNITS TO A DATA-PROCESSING ASSEMBLY

The invention relates to an inserted device for connecting auxiliary storage units to a data-processing assembly.

There are various already-known kinds of interfaces for auxiliary storage units. The known interfaces usually comprise a control cable A and a high transmission-speed cable B for each storage unit. The control cable A conveys the information necessary for controlling and operating the storage unit, whereas the cable B mainly conveys high-speed data and information.

There are two known kinds of interfaces for connecting a given data-processing assembly to a number of auxiliary storage units. One kind of interface is called "DAISY-CHAIN" and the other kind of interface is called "STAR".

The invention does not relate to star interfaces, where each storage unit is directly connected to the data-processing assembly, independently of one another, by an individual control cable A and by an individual high transmission-speed cable B. When the interface is of the daisy-chain kind, it comprises only one control cable A for all the storage units; the cable A connects the data-processing assembly to a first storage unit and the other units to one another in a chain, down to the last unit, which comprises a terminating device called the "terminator". The storage units are thus connected in series relative to the control cable A. Each storage unit is also directly connected to the data-processing assembly by an individual high transmission-speed cable B.

Known daisy-chain interfaces are satisfactory and have the advantage of simplifying the connections to the data-processing assembly. For example, only one controller is required for a number of storage units.

However they have a serious disadvantage in that a storage unit cannot be switched off or disconnected from the chain without interfering with the operation of the other units, since the control cable A is cut when a unit is disconnected. It is therefore necessary for all the units to be previously switched off. This complicates maintenance and testing of the storage units and excessively interferes with the operation of all the storage units and the entire data-processing assembly.

The invention aims to obviate these disadvantages and proposes an inserted device for connecting auxiliary storage units to a data-processing assembly, the units normally being connected on the one hand by a daisy-chain control cable A connecting the storage units to one another and to the data-processing assembly, and on the other hand by high transmission-speed star cables B, each storage unit being independently connected to the data-processing assembly by a high transmission-speed cable B. The device according to the invention is characterised in that it comprises means for disconnecting and connecting each auxiliary storage unit in the data-processing assembly without interfering with the operation of the other auxiliary storage units.

The device according to the invention comprises means for on-line testing an auxiliary storage unit without interfering with the operation of the other storage units, and means for converting the single control cable A from the data-processing assembly into a number of control cables A intended for each respective auxiliary storage unit, which is then star connected directly to the device according to the invention by an individual control cable A and by an individual high transmission-speed cable B. The device according to the invention is transparent for with respect to data conveyed on high transmission speed cables B.

By means of the device according to the invention, a daisy-chain interface of a data-processing assembly controller comprising a control cable A and a number of high transmission-speed cables B can be converted into a star interface in which each unit is connected independently of the others.

A data-processing assembly comprising a device according to the invention therefore has all the advantages of the daisy-chain interface (a number of units per controller, simplified access logic, use of standard controllers with rapid-access inserted storage, etc.) without the disadvantages thereof, since each unit can be switched off, disconnected and tested without interfering with the operation of the other units connected to the same controller.

A device according to the invention also permits double-access use of the auxiliary storage units.

During normal operation, a device according to the invention is transparent, meaning that the data-processing assembly may access the storage units as if they were connected in a chain in the normal manner.

The invention will be more clearly understood from the following description of a preferred embodiment with reference to the accompanying drawings in which.

Figure 1:
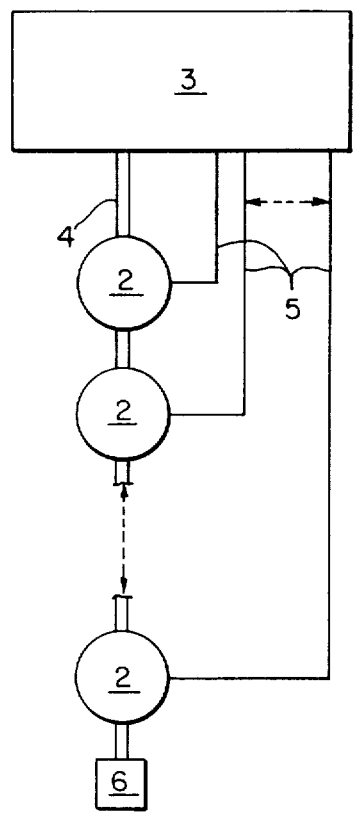
FIG. 1 is a block diagram illustrating auxiliary storage units connected to a data-processing assembly via a prior-art daisy-chain interface, without using a device according to the invention.

FIG. 1 illustrates a prior-art method of connecting auxiliary storage units 2 in a daisy-chain configuration to a data-processing assembly 60, more particularly to at least one auxiliary storage unit controller 3 in the data-processing assembly 60. The interface between the controller 3 and the storage units 2 is of the daisy-chain kind and comprises a control cable 4 and a number of high transmission-speed cables 5. Those skilled in the art generally refer to the cable 4 as "the A cable" and the cables 5 as "the B cables." The number of cables 5 is equal to the number of storage units 2, since each cable 5 corresponds to a storage unit 2. A terminator 6 is provided at the free end of the control cable 4 after the last storage unit 2.

In practice, the auxiliary storage units 2 may be magnetic or optical discs, which may be hard or floppy, fixed or movable, or comprise magnetic tapes or other means. In the case of hard magnetic discs, the interface connectors comprise a standard sixty-five point type plug or a seventy-five multiplexed point plug. In the first case the control cable 4 comprises sixty connection points and the high transmission-speed cable 5 comprises twenty-six points. In the second case, the control cable 4 comprises seventy-five points and the high transmission-speed cable 5 comprises thirty-four points.

In the preferred embodiment the interface is of the standard sixty-point kind, but the invention can easily be adapted to other kinds of interface, inter alia seventy-five multiplexed points.

Controller 3 is preferably an inserted storage controller as described in French patent specification No. 80 14929, allowing rapid access to the auxiliary storage units 2. It may e.g. be a Diram (registered trade-mark) or a Dorsal (registered trade-mark).

As shown in FIG. 1, the prior-art daisy-chain configuration does not allow a storage unit 2 to be disconnected independently of the others, without interfering with the operation of the other storage units 2.

Figure 2:
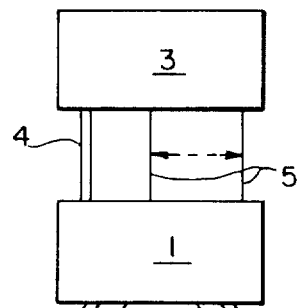
FIG. 2 is a block diagram illustrating auxiliary storage units connected to a data-processing assembly via a device according to the invention.

Referring now to FIG. 2, an inserted device 1 according to the invention for connecting auxiliary storage units 2 to a data-processing assembly 60 comprises means for disconnecting and connecting each auxiliary storage unit 2 from or to the data-processing assembly 60 without interfering with the operation of the other auxiliary storage units 2.

A device 1 according to the invention comprises means for converting the control cable 4 from the data-processing assembly 60 into a number of control cables 4 intended for each respective auxiliary storage unit 2. Also, a device 1 according to the invention is transparent for information transmitted by the high transmission-speed cables 5, either from the data-processing assembly 60 to each storage unit 2 or contrariwise from each storage unit 2 to the data-processing assembly 60. The reason is that the information travelling along cables 5 is coded in the same manner for the data-processing assembly 60 (and for the auxiliary storage unit controllers 3) as for the storage units 2. Consequently the values for this information do not need to be modified in a device 1 according to the invention. Preferably, however, means are provided for resynchronising information between the cables 5 from the storage units 2 and the cable 5 from the data-processing assembly controller 3. Resynchronisation will be based on a clock signal from the corresponding controller 3 or the storage unit 2 or from the device 1 according to the invention, depending on the situation. These resynchronisation means are already known in the prior art and will not be further described hereinafter. Accordingly, each auxiliary storage unit 2 is star-connected directed to the device 1 according to the invention via an individual control cable 4 and an individual high transmission-speed cable 5.

FIG. 2 shows two storage units 2 connected to a device according to the invention. Of course, a number of other units 2 can be connected if required in which case a corresponding number of high transmission-speed cables 5 will be provided between device 1 and controller 3. For technological reasons (maximum length of cables, electric matching, numbers of units on only four bits etc.) the number of auxiliary storage units 2 which can be connected to a controller 2 via a device 1 according to the invention is limited. In practice, the maximum number is usually sixteen.

A ground wire (not shown) also connects each auxiliary unit 2 to device 1 according to the invention, and device 1 to controller 3, in known manner.

A terminator 6 is associated with each auxiliary storage unit 2 which terminator 6 electrically terminates the end of the corresponding control cable 4.

A device 1 according to the invention preferably comprises means for remote-controlling it from controller 3, or for remote-controlling other devices.

The device 1 according to the invention can be used for double access. In that case each storage unit 2 is connected by individual control cables 4 and high transmission-speed cables 5 to two devices 1 according to the invention, each device 1 being connected to a controller 3 using the same configuration as shown in FIG. 2. Each storage unit 2 is connected by two control cables 4 and two high transmission-speed cables 5, and accordingly includes two terminators 6, one for each cable 4. Each device 1 is connected to a controller 3 by a control cable 4 and high transmission-speed cables 5 in number equal to the number of units 2.

Figure 3:
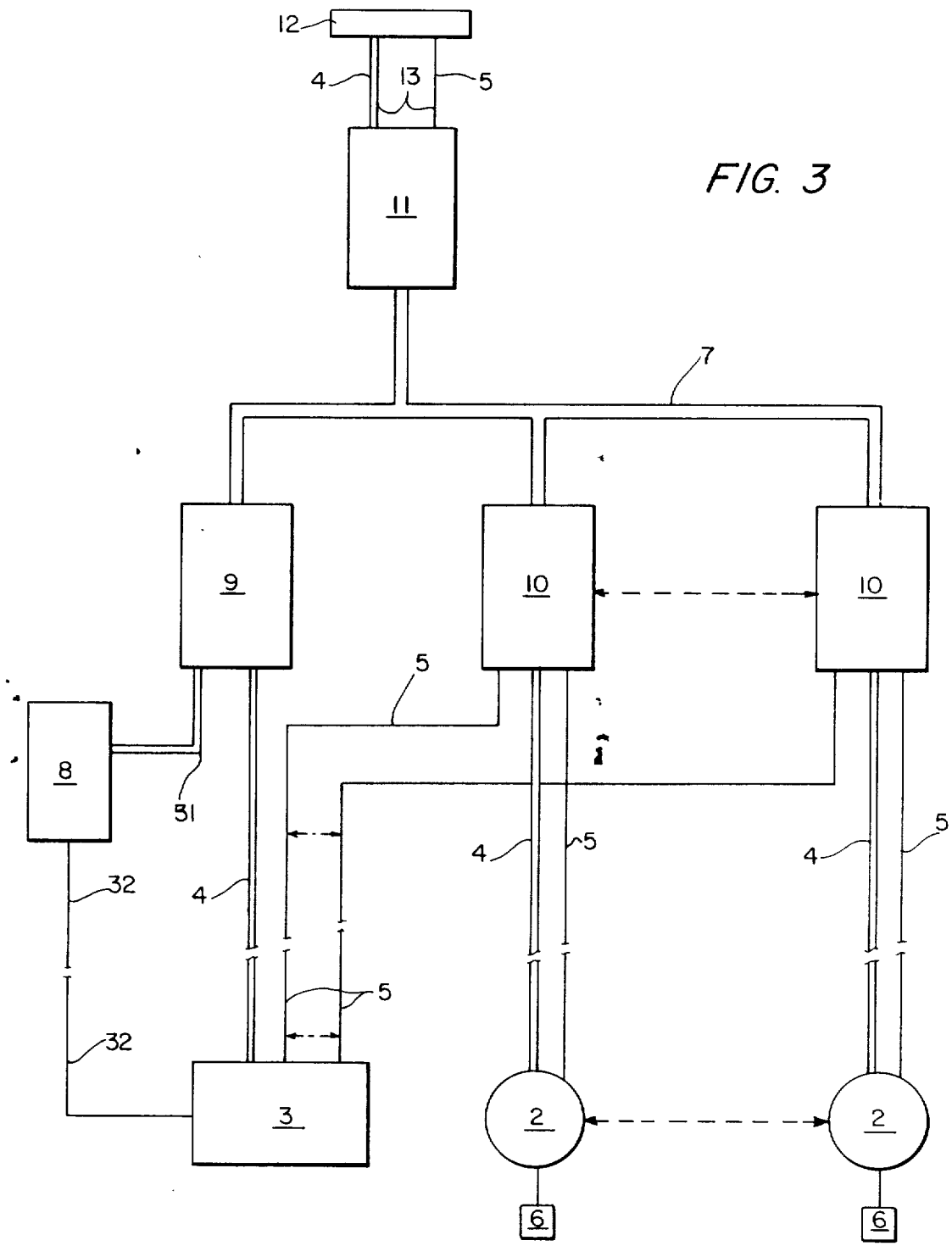
FIG. 3 is a block diagram of the various constituent parts of a device according to the invention.

Referring now to FIG. 3, device 1 according to the invention preferably comprises means 11 for connecting and disconnecting at least one auxiliary storage unit 2 to or from at least one independent channel 13 without interfering with the operation of the other storage units 2. The means for disconnecting and connecting each storage unit 2 from or to the data-processing assembly 60, and the means for connecting and disconnecting at least one storage unit 2 to at least one independent channel 13 are logical disconnecting and connecting means which operate when a storage unit 2 is physically connected to the device 1 according to the invention. In the preferred embodiment, a single independent channel 13 is provided, so that a single storage unit 2 can be connected at a given moment.

The following is a more detailed description of the construction of a device 1 according to the invention as shown in FIG. 3, which by way of example shows two auxiliary storage units 2 connected with single access.

The device 1 according to the invention comprises a basket bus 7 conveying all the information; a control card 8 for controlling the device 1, either manually or automatically by remote control via controller 3; a basket-bus multiplexing card 9 which controls the information conveyed by bus 7; one or more multiplexing card(s) 10 for each auxiliary storage unit 2 which card 10 controls the connection between the storage unit 2 and the basket bus 7, and which card 10 provides a transparent but synchronised connection between the high transmission-speed cables 5.

Optionally, an independent connection card 11 can be used for connecting or disconnecting a storage unit 2 to or from an independent channel 13 associated with test means or with another controller 12. A device 1 according to the invention can thus be used for testing a storage unit 2 under actual operating conditions.

The control cable 4 of the controller 3 of the data-processing assembly is directly connected to the bus multiplexing card 9. The high transmission-speed cables 5 of controller 3 are directly connected to the respective unit multiplexing cards 10.

The control card 8 comprises permanently-visible visual indicators for supplying various information to the user, as follows:

a fault indicator actuated by an ERREUR (fault) signal when one of the cards connected to the basket bus 7 has detected a fault in the supply voltage;

a warning indicator which can be in three states, depending on an ATTENT (warning) signal, as follows:

switched off under normal conditions or blinking if one of the connected units 2 is faulty or lit up if two units 2 bearing the same number have been selected together.

one indicator per storage unit 2 showing the activity of the storage unit. This indicator lights up when the storage unit 2 is engaged in a read-in or write-out or positioning operation, and an "on" indicator which indicates the state of the general electricity supply in dependence on a MARCHE ("on") signal.

The aforementioned signals ERREUR, ATTENT, and MARCHE, are controlled by the bus multiplexing card 9.

The control card 8 also comprises three-way switching means for starting up or stopping or remote-controlling the device 1.

When device 1 starts up, it is energised by an ON signal which changes from unity to zero logic level. The RESET signal for resetting the device 1 is then actuated for a certain time, about two seconds, and is sent to the bus multiplexing card 9. The permanently-visible indicators are lit up for the duration of the RESET signal. Switch means such as a button are used for manually transmitting the RESET signal.

The supply means supply dc voltages of the order of −12V, −5V, 0V, +5V and +12V. The interface emitters and receivers are supplied with −5V and +5V. On starting, the RESET signal inactivates the interface emitters and receivers (by cutting off the supply),for which the switch on the control card 8 is in the disconnected position. Accordingly, the device is in the state in which it was when stopped. The ERREUR signal is transmitted when one of the voltages is faulty.

The control card 8 also comprises two button switches P4 and P2, a two-position switch for each storage-unit multiplexing card 10 (i.e. 16 switches in practice) and at least one coding wheel, these means partially comprising, in a preferred embodiment, the means for logically connecting and disconnecting the storage units 2.

The procedure for disconnecting a given storage unit 2 is as follows:

the number of the storage unit 2 is displayed on the coding wheel;

the recognition button P4 is actuated. If unit 2 has been selected at least once, an indicator recognising the multiplexing card 10 associated with the unit 2 will light up. The operator then registers the number of the corresponding unit multiplexing card 10.

the card 8 for controlling the switch corresponding to the registered unit multiplexing card 10 is actuated so as to move the card 10 from the "unit connected" position to the "unit disconnected" position. An indicator for recognising the switch then lights up on the multiplexing card 10 in question, thus enabling the operator to make certain that he is acting on the right switch; and the action button P2 is actuated, thus triggering the effective disconnection of the storage unit 2 by cutting off the electric supply to the emitting and receiving circuits of the interface cables 4, 5 of the associated multiplexing card 10. These cables can then be physically disconnected from the unit multiplexing card 10.

The recognition button P4 and the coding wheel of the control card 8 constitute the means for recognising the multiplexing card 10 physically associated with a given unit 2. The user can therefore act on the two-position switch of the multiplexing card 10 actually associated with the unit 2 in question.

When a storage unit 2 is selected by the data-processing assembly via the device according to the invention, its number is stored in a register of the unit multiplexing card to which it is physically connected. Button P4 can be actuated so as to emit the signal LOG along the basket bus 7, thus enabling bus lines NUM0, NUM1, NUM2, NUM3 which correspond to the unit number expressed in binary, whereupon each unit multiplexing card 10 compares its stored unit number with the NUM bus number, and the card 10 for which these two numbers are identical emits a recognition signal which triggers a visual indicator 18. Subsequently, when one of the two-position switches is actuated, the number of the corresponding multiplexing card 10 is coded on bus lines NUM0-NUM3 via the bus multiplexing card 9, which card 9 emits the signal DISC indicating that a switch has been triggered. The multiplexing card 10 in question is then recognised by emitting a signal enabling a visual indicator 17 for recognising the switch, and disconnection on card 10 can be enabled by the signal POUS (button) emitted by the action button P2. If unit 2 has never been selected, no multiplexing card 10 is recognised through the action of button P4 on the control card 8. In that case the user must either select unit 2 at least once from the data-processing assembly 60, or must manually determine (by following the wiring) which multiplexing card 10 is physically associated with unit 2.

A storage unit 2 is connected by exactly the reverse procedure, i.e. by acting on the switch of the control card 8 corresponding to the corresponding multiplexing card 10 and, after recognition, acting on button P2 which restores the electric supply to the emitting and receiving circuits of the interface cables 4, 5 of the multiplexing card 10.

Button switching means P3 for the control card 8 are used to re-zero the triggers of the multiplexing cards 9, 10 which memorise any fault in a storage unit 2.

The bus multiplexing card 9 comprises the following visual indicators:

read-in or write-out positioning fault in supply voltage and selected unit.

Each unit multiplexing card 10 comprises the following light indicators:

selected unit unit selected at least once fault memorised on the unit fault in supply voltage 14 (blinking): prohibits physical disconnecting of cables 15: independent connection on the independent connection card 11

16: logic disconnection carried out

17: recognition of actuated disconnection switch and

18: recognition of the unit 2 whose number is displayed on the coding wheel of the control card 8.

The independent connection card 11 comprises at least one coding wheel and an actuating button switch P6 which triggers the process whereby the unit 2 associated with the unit multiplexing card 10 whose number is displayed on the coding wheel is connected to the independent channel 12 associated with the independent connection card 11.

Accordingly, when a storage unit 2 has been logically disconnected from controller 3, it can be connected to the independent channel 13 (to test means or to another controller 12) by the following procedure:

the number of the corresponding unit multiplexing card is displayed on the coding wheel of the independent connection card 11. If the unit multiplexing card 10 is logically disconnected from the normal channel, the independent connection indicator 15 for the card 10 lights up, indicating that the card 10 can be placed on the independent channel 13.

the button switch P6 is actuated and reactivates the emitters and receivers of the unit multiplexing card 10 whose connection indicator 16 has gone out. Button-switch P6 can be re-activated so as again to logically disconnect the unit multiplexing card 10.

The bus lines NUMV0-NUMV3 convey the binary number of the coded multiplexing card 10 on the coding wheel of the independent connection card 11. The logical connection and disconnection of the multiplexing card 10 is enabled by the signal POUSV from the action button P6. Preferably the coding wheel of the independent connection card 11 has no influence except when no unit 2 has already been connected to the independent channel 13. In the preferred embodiment, only one unit 2 can be connected to the independent channel 13, and when this is actually the case, the coding wheel (and consequently the bus NUMV) becomes inoperative. Any action on the action button P6 will then result in disconnecting the independent channel 13 from the unit 2 previously connected thereto.

Figure 4:
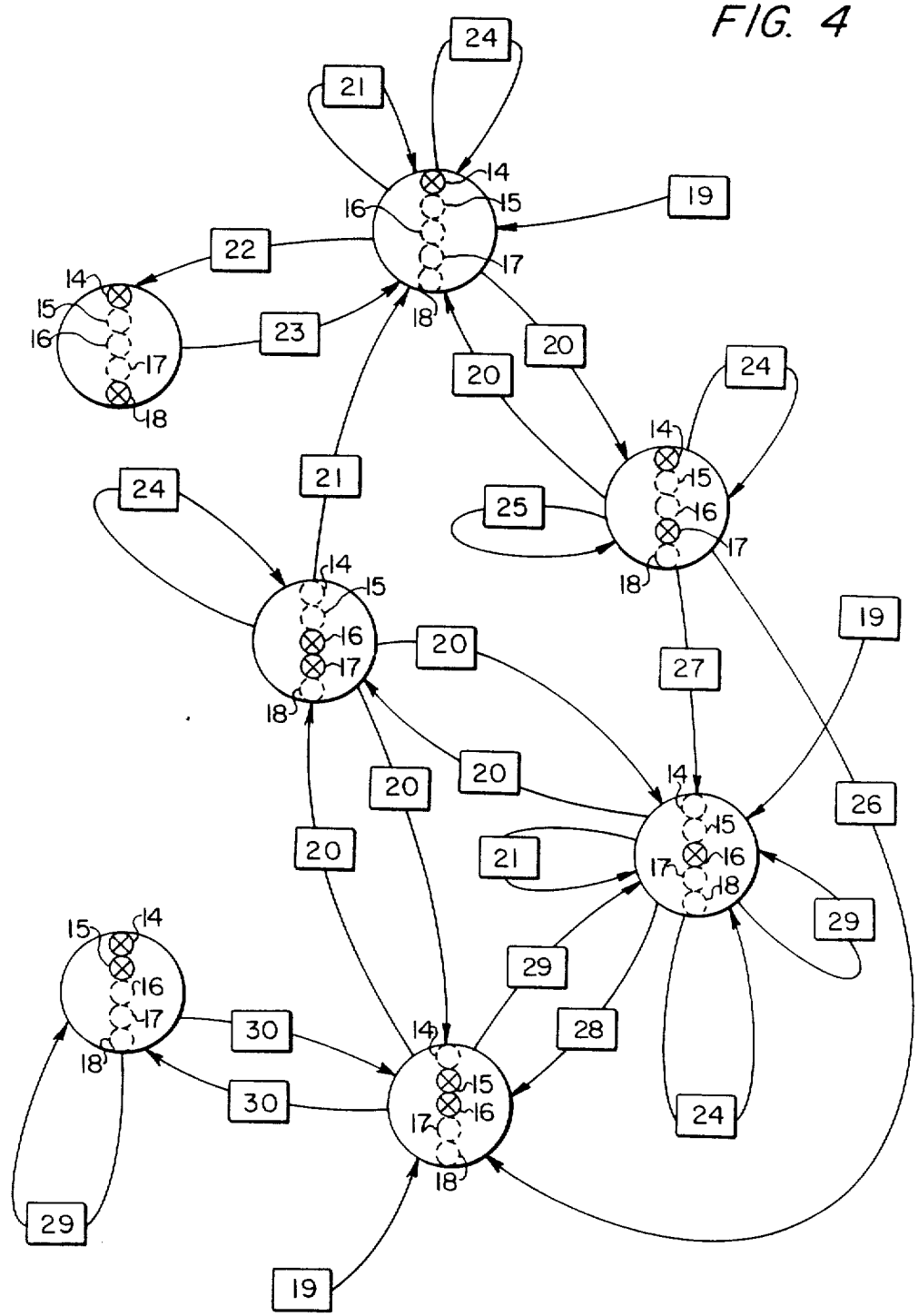
FIG. 4 is a logical block diagram of possible states of the visual indicators in a storage unit multiplexing card which is one component of a device according to the invention.

FIG. 4 shows the state of the following indicators of the card 8: 14 blinks to warn against disconnection; 15, independent connection; 16, disconnection; 18, recognition of unit 2; and 17, recognising the disconnection switch when actuated, in dependence on the user's actions. Table 1 explains the references numbered 19-30 FIG. 4, for these actions. In FIG. 4, a cross on the indicator indicates that it is lit up.

When a unit 2 is connected to the normal channel of the control and bus multiplexing cards 8, 9 accessing the controller 3, any effort to make a connection to the independent channel 13, using the independent connection channel controller 11, will be fruitless. Contrariwise, if a unit 2 is connected to the independent channel 13, any effort to connect to the normal channel, using the control card 8, will be fruitless.

TABLE 1

| REFERENCE | CORRESPONDING ACTION |
|---|---|
| 19 | RESET (button switch P1 is pressed) |
| 20 | Action on the switch of the control card 8 corresponding to the unit multiplexing card 10 in question, for making a logic connection or disconnection. |
| 21 | Action on the button switch P2 for actuating the control card 8. |
| 22 | Action on the logic button switch P4, the number displayed on the coding wheel of the control card 8 being equal to the number of the unit 2 corresponding to the unit multiplexing card 10. |
| 23 | Logic button switch P4 is released. |
| 24 | Action on a switch of the control card 8 corresponding to another unit multiplexing card 10. |
| 25 | Action on the coding wheel of the independent connection card 11. |
| 26 | Action 21 when the number displayed on the coding wheel of the independent connection card 11 is equal to the number of the unit multiplexing card 10. |
| 27 | Action 21 when the number displayed on the coding wheel of the independent connection card 11 is different from the number of the unit multiplexing card 10. |
| 28 | Display of the number of the unit multiplexing card 10 on the coding wheel of the independent connection card 11. |
| 29 | Discontinuance of display of the number of the unit multiplexing card 10 on the coding wheel of the indepedent connection card 11. |

TABLE 1-continued

| REFERENCE | CORRESPONDING ACTION |
|---|---|
| 30 | Action on the button switch P6 for actuating the independent connection card 11. |

A unit multiplexing card 10 is logically disconnected by cutting off the voltages supplying the interface emitters and receivers of the card 10, by cutting off the +12 V and −12 V currents which in turn generate the +5 V and −5 V currents via regulators. Power transistors are preferably used for this purpose.

The voltage at the output of the regulators supplying the +5 V and −5 V currents energising the emitters and receivers is monitored by a transistorised assembly which generates a fault signal on the bus multiplexing card 9 which in turn emits the ERREUR signal and lights up an indicator on the control card 8 when a fault is detected. When the storage unit 2 is deliberately disconnected, the fault signal is cancelled before the voltage is cut off.

Once the unit multiplexing card 10 to be disconnected has been recognised (whether from the control card 8 or the independent connection card 11), the operator must actuate a push-button (P2 for the control card 8 and P6 for the independent connection card 11) for enabling the disconnection command. When this command comes from the independent connection card 11, the interface emitters and receivers of the unit multiplexing card 10 are de-energised immediately. If on the other hand the command comes from the command card 8, two situations may occur:

the unit 2 to be disconnected is free or about to be free, (i.e. a signal USLCTD is on top or is about to rise). In that case, de-energisation occurs immediately.

unit 2 is selected by controller 3. If unit 2 has not been released after about 8 seconds, the interface emitters and receivers of the unit multiplexing card 10 are de-energised. To this end, the controller 3 is twice resynchronised on the clock CLCK from the bus multiplexing card 9, transmitted along the basket bus 7.

When the signal for inactivating the interface emitters and receivers of the unit multiplexing card 10 is actuated, the visual indicator of card 10, which visual indicator indicates that the interface emitters and receivers are energised and prevents the cables from being disconnected, stops blinking and goes out.

A device 1 according to the invention preferably comprises means for monitoring the dc supply voltages and means for permanently transmitting the RESET signal and operating when a fault is detected in a direct voltage.

A device 1 according to the invention can be remote-controlled by one to four external devices (such as the controller 3) when the key is in the remote-control position. Remote control is brought about by sending a direct voltage, e.g. of about 5 V, from the external device through a cable 32. A device 1 can also remote-control at least one other external device by sending a direct voltage.

A device 1 comprises means for serially rotating the storage units connected thereto, which means transmit two remote-control signals to the storage units 2, the signal PICK for serially rotating the storage units and the signal HOLD for enabling the preceding signal. These two signals are directly transmitted along the basket bus 7. They need not be carried on emitting and receiving devices. When a unit multiplexing card 10 receives the PICK signal sent by the bus multiplexing card 9, a pulse is generated whereby the number imposed by the basket bus 7 on the unit multiplexing card 10 is loaded into a counter. If the number is 0, a signal is positioned so as place a relay in the operating position. The PICK signal is then sent to the storage unit. If on the other hand the number of the unit multiplexing card 10 is different from 0, the counter is moved back one step at each clock/signal (about once every 16 seconds). When it reaches the value 0, a signal is sent so as to put the relay in the operating position. Whenever a unit 2 is disconnected from the control card 8, it stops since the PICK signal sent thereto will be inoperative.

If the storage unit 2 is connected to the independent channel 13 via the independent connection card 11, it will start up as soon as the connection is enabled, since only one unit can be connected to the independent channel 13 at a given time.

Furthermore, if the storage units 2 are not in the remote-control position, the sequential starting generated by the device according to the invention will be inoperative.

The HOLD signal sent to the unit 2 to stop it when device 1 is remote-controlled is positioned by a relay which in turn is controlled by the "logic or" of the HOLD signals transmitted by the two channels when they are enabled.

A cable fault signal OCD is transmitted to the storage unit 2 when an OCD signal for the normal channel or an OCDV signal for the independent channel is transmitted along the basket bus 7.

The bus multiplexing card 9 comprises the logic means for disconnecting the storage units 2. Card 9 constitutes the interface between the control card 8 and the unit multiplexing cards 10. In a preferred embodiment, the card 9 is connected to the control card 8 by a sixty-point cable 31 having signals as set out in Table 2, and is also connected to the basket bus 7 and to the control cable 4 from controller 3. The information POUS and LOG coming respectively from button P2 and logic button P4 of control card 8 are used for disconnecting the control units 2 and are retransmitted along basket bus 7 to the unit multiplexing cards 10. The RESET signal from the control card 8 is used by the bus multiplexing card 9 for resetting its functions and is re-transmitted to the cards 10, 11 connected to bus 7. Signals SW10 to SWI15 give the state of the two-position switches of the control card 8. The bus multiplexing card 9 multiplexes signals SW1 in a DISC signal transmitted along the basket bus 7 with the number of the corresponding unit 2.

TABLE 2

| POINT | INFORMATION |
|---|---|
| 1 | 0V |
| 2 | +5V |
| 3 | +5V |
| 4 | 0V |
| 5 | LED0 |
| 6 | LED1 |
| 7 | LED2 |
| 8 | 0V |
| 9 | LED6 |
| 10 | LED7 |
| 11 | LED8 |
| 12 | 0V |
| 13 | LED12 |
| 15 | LED14 |
| 16 | 0V |
| 17 | MARCHE ("ON") |
| 18 | RZ FAULT |

TABLE 2-continued

| POINT | INFORMATION |
|---|---|
| 19 | LOG |
| 20 | SWI1 |
| 21 | SWI2 |
| 22 | SWI5 |
| 23 | SWI6 |
| 24 | SWI9 |
| 25 | SWI10 |
| 26 | SWI13 |
| 27 | SWI14 |
| 28 | 0V |
| 29 | −12V |
| 30 | 0V |
| 31 | 0V |
| 32 | +5V |
| 33 | +5V |
| 34 | 0V |
| 35 | RESET |
| 36 | 0V |
| 37 | LED3 |
| 38 | LED4 |
| 39 | LED5 |
| 40 | 0V |
| 41 | LED9 |
| 42 | LED10 |
| 43 | LED11 |
| 45 | LED15 |
| 46 | ERREUR (FAULT) |
| 47 | ATTENT (WARNING) |
| 48 | 0V |
| 49 | POUS (BUTTON) |
| 50 | SWI0 |
| 51 | SWI3 |
| 52 | SWI4 |
| 53 | SWI7 |
| 54 | SWI8 |
| 55 | SWI11 |
| 56 | SWI12 |
| 57 | SWI15 |
| 58 | 0V |
| 59 | +12V |
| 60 | 0V |

The bus multiplexing card 9 is permanently sent through bus 7, using a counter and a delay line serving as a clock. The DISC signal gives the state of the switch whose number is identical with that coded on the NUM bus showing the number of the corresponding unit, or the number of the multiplexing card 10 when the LOG signal is inoperative after button P4 has been released.

Signals NUM and DISC transmitted on basket bus 7 by the bus multiplexing card 9 are sychronised on a STROBE signal which is also transmitted to the unit multiplexing cards 10.

The multiplexing card 9 has a trigger storing a signal determined by performing a logical OR on the fault signals of the storage units 2. When the zero-resetting button P3 is actuated, the control card 8 transmits the RZ FAULT signal for resetting the trigger.

The multiplexing card 9 also supplies the control card 8 with all the LED, ATTENT (warning), ERREUR, (fault) and Marche ("on") signals controlling the permanently-visible indicators on control card 8. These signals represent the logical OR of the real meaning of the indicator and the RESET signal.

Each unit multiplexing card 10 sends an activity signal for the associated unit 2 to the bus multiplexing card 9. Card 9 collects this information and sends it along the LED bus to the control card 8 for the corresponding visual indicators.

The MARCHE signal is transmitted when the multiplexing card 9 detects the presence of a direct voltage, e.g. of about +5 V.

The ERREUR signal is the "logic OR" of voltage faults in the various cards 9, 10, 11 connected to bus 7.

A device according to the invention comprises means for detecting the fact that two storage units 2 are simultaneously trying to access the bus 7 via their associated multiplexing card 10. The detection means trigger means for automatically disconnecting the units 2 if such an event occurs, and also comprise means for displaying the fault.

When two unit multiplexing cards 10 simultaneously try to access the bus 7, the bus multiplexing card permanently transmits the ATTENT (warning) signal. The ATTENT signal is transmitted intermittently so as to blink the warning indicator when a fault in a storage unit 2 is stored.

The bus multiplexing card 9 also monitors the units 2 connected to the various unit multiplexing cards 10 and also monitors the cards 10 themselves. If two units 2 connected to device 1 bear the same number, when the controller is about to select the unit 2 bearing this number, the two multiplexing cards 10 associated with these two units will try to reserve the basket bus 7. If furthermore the controller 3 requires a read-out on unit 2, the two unit multiplexing cards 10 will try to transmit simultaneously, which may harm their transmitting device. For this reason, the bus multiplexing card 9 checks that only one unit multiplexing card 10 is requesting the basket bus 7. When the controller 3 sends a unit selection via the bus multiplexing card 9, the selected unit or units reply with the signal USLCTD. This signal is transmitted by the unit multiplexing cards 10 using an open-collector emitter and via a resistor, preferably of about 390 ohms. Thus, if a single unit multiplexing card 10 is simultaneously transmitting the signal ULSCTD, the voltage of a MULSEL signal has a given value, e.g. of approximately 2.5 V. whereas if two unit multiplexing cards 10 recognise one another, the MULSEL signal voltage is below the preceding value, e.g. about 1.7 V. The MULSEL signal arrives at one input of an operational amplifier (e.g. type LM339) connected as a comparator. To prevent any risk of interference, the comparator output must remain stable for about 50 nanoseconds to enable the bus multiplexing card 9 to signal that two units 2 have the same number. The bus multiplexing card 9 then positions the DESEL signal on the basket bus 7, so that the two unit multiplexing cards 10 in question release bus 7.

In addition to thus monitoring the unit multiplexing cards 10, the bus multiplexing card 9 monitors the activity of units 2 via three visual indicators. The first indicator lights up when one unit 2 is connected. The second indicator lights up when the selected unit 2 is engaged in reading-in or writing-out. The third indicator lights up when the selected unit 2 is positioning a head. Each unit multiplexing card 10 has the task of transmitting the activity of their associated unit 2 to the bus multiplexing card 9. This function is performed by two demultipliers having open-collector outputs. When unit 2 is engaged in an operation (read-in or write-out or positioning), only the output corresponding to the number borne by unit 2 will be at the active logic level. When unit 2 is inoperative, all the outputs are at the same operative logic level. In addition, in order to signal to the bus multiplexing card 9 that the unit 2 connected thereto has been selected, the unit multiplexing card 10 positions the following two signals on bus 7:

the USLCTD signal; the bus multiplexing card 9 will use this signal to make up the "logic OR" of all selections of bus units 2, and the MULSEL signal; the bus multiplexing card 9 uses this signal to find out whether a number of units 2 have been simultaneously selected since they bear the same number.

The bus multiplexing card 9 of a device 1 according to the invention comprises clock means providing a base clock signal for device 1. The period of the clock signal is about half a second. The clock signal is used by all the unit multiplexing cards 10 to blink a visual indicator. Another clock signal, which has a period of about four times that previously mentioned, is used by all the unit multiplexing cards 10 to calculate a maximum inoperative time, which is relatively long.

All signals from the control cable 4 originating from controller 3 are sent along the basket bus 7. The receiving devices are always enabled. Since these devices have opencollector outputs, these outputs must be kept at +5 V by resistors, preferably resistors of about 390 ohms.

Signals intended for controller 3 are sent along the cable by transmitting devices, which are always enabled.

The interface receivers of the high transmission-speed cable 5 are always enabled on the unit multiplexing card 10 when the card is seen from one of the two channels (the independent channel 13 or the normal channel of controller 3). The interface receivers of cable 5 on the independent connection card 11 are enabled irrespective of the state of the unit multiplexing card 10. All signals at the receiver outputs are kept at +5 V by resistors, e.g. of 390 ohms, since these resistors have open-collector outputs. Most of these signals are directly sent along bus 7 to the independent connection card 11 via a transmitting device which is enabled when the unit multiplexing card 10 is seen from the independent channel 13.

Data signals in writing WRDATA and RDDATA signals are resynchronised on two clocks (WRCLK and RDCLK) respectively before being re-transmitted along the corresponding high transmission-speed cable 5. On reception, each signal is resynchronised with the leading edge of its clock, whereas it is synchronised with the trailing edge on transmission.

The device 1 according to the invention is therefore totally transparent to signals conveyed by cables 5.

All signals from the control cable 4 are retransmitted along the basket bus 7 or come therefrom. The signals can be enabled on two buses constituting the bus 7, i.e. a normal channel bus between the bus multiplexing card 9 and the unit multiplexing cards 10, and an independent channel bus between the independent connection card 11 and the unit multiplexing cards 10. The signals received by unit 2 cannot be enabled on either of the two buses unless the following conditions are fulfilled:

the unit multiplexing card 10 is seen from the bus multiplexing card 9 or from the independent connection card 11, and the unit 2 connected to the unit multiplexing card 10 is selected by the bus multiplexing card 9 or the independent connection card 11.

If furthermore the DESEL signal is the bus multiplexing card 9 (indicating that two unit multiplexing cards 10 want to transmit along the bus for access to the bus multiplexing card 9) the transmitters on the basket bus 7 are inactivated to prevent damage to the transmitters on the two transmitting cards 10.

The receivers receiving the signals for units 2 from bus 7 are enabled as soon as the unit multiplexing card 10 is seen from one of the two channels. The interface transmitters and receivers of the corresponding unit 2 are then permanently enabled.

The signals conveyed by bus 7 are as set out in Table 3. In the preferred embodiment of the invention, each of the two buses constituting the basket bus 7 has twice forty-three points. In addition to the electric supply (0 v, 5 v, +12 v, and −12 v) the normal channel bus and the independent channel bus convey one hundred and thirteen signals. Advantageously, lines at 0 v are inserted between certain points to prevent interference.

SEL, DESEL and RESET, ACTIV0 TO ACTIVE16 corresponding to the indicators visible from the control card 8 indicating the activity of units 2 (read-in write-out and positioning) and CLFAULT transmitted by the fault-cancelling button P3.

Signals having the same name but ending in a V relate to the independent channel 13. The independent channel bus also contains the signals from the high transmission-speed cable 5, as follows: RES1V and RES2V for reserved lines, end of positioning SEEKNEV, pilot clock SERCLKV, read-in and write-out clock RDCLKV and WRCLK, and read-in and write-out data RDDATAV and WRDATA. These signals are necessary, e.g. for testing the unit 2 connected to the independent channel 13.

TABLE 3

| NORMAL CHANNEL | | POINT NUMBER | INDEPENDENT CHANNEL | |
|---|---|---|---|---|
| +5 V | +5 V | 1 | 0 V | MSPHY0 |
| +5 V | +5 V | 2 | MSPHY1 | MSPHY2 |
| 0 V | 0 V | 3 | 0 V | MSPHY3 |
| 0 V | BIT1D | 4 | STROBE | DISC |
| 0 V | 0 V | 5 | 0 V | BITV10 |
| BIT0 | BIT1 | 6 | BITV0 | BITV1 |
| 0 V | BIT2 | 7 | 0 V | BITV2 |
| BIT3 | BIT4 | 8 | BITV3 | BITV4 |
| 0 V | BIT5 | 9 | 0 V | BITV5 |
| BIT6 | BIT7 | 10 | BITV6 | BITV7 |
| 0 V | BIT8 | 11 | 0 V | BITV8 |
| BIT9 | USTAG | 12 | BITV9 | USTAGV |
| 0 V | TAG1 | 13 | 0 V | TAGV1 |
| TAG2 | TAG3 | 14 | TAGV2 | TAGV3 |
| 0 V | SELU0 | 15 | 0 V | SELUV0 |
| SELU1 | SELU2 | 16 | SELUV1 | SELUV2 |
| 0 V | SELU3 | 17 | 0 V | SELUV3 |
| NUM3 | NUM2 | 18 | NUMV0 | NUMV1 |
| 0 V | NUM1 | 19 | 0 V | NUMV2 |
| NUM0 | POUS | 20 | NUMV3 | POUSV |
| 0 V | BUSY | 21 | 0 V | BUSYV |
| INDEX | SECT | 22 | INDEXV | SECTV |
| 0 V | FAULT | 23 | 0 V | FAULTV |
| SEEKER | ONCYL | 24 | SEEKERV | ONCYLV |
| 0 V | URDY | 25 | 0 V | URDYV |
| AMF | WRPTCD | 26 | AMFV | WRPTCDV |
| 0 V | USLCTDB | 27 | 0 V | USLCTDV |
| PICKB | HOLDB | 28 | PECKV | HOLDV |
| 0 V | OCD | 29 | 0 V | OCDV |
| MULSEL | DESEL | 30 | RES1V | RES2V |
| 0 V | SEEKEND | 31 | 0 V | SEEKENV |
| RESET | CLFAULT | 32 | SERCLKV | RDCLKV |
| 0 V | ACTIV0 | 33 | 0 V | RDDATAV |
| ACTIV1 | ACTIV2 | 34 | WRCLK | WRDATA |
| 0 V | ACTIV3 | 35 | 0 V | BLINK |
| ACTIV6 | ACTIV5 | 36 | CLKC | ERRT |
| 0 V | ACTIV6 | 37 | 0 V | 0 V |
| ACTIV7 | ACTIV8 | 38 | LOG | 0 V |
| 0 V | ACTIV9 | 39 | 0 V | 0 V |
| ACTIV10 | ACTIV11 | 40 | −12 V | −12 V |
| 0 V | ACTIV12 | 41 | +12 V | +12 V |
| ACTIV13 | ACTIV14 | 42 | +5 V | +5 V |
| 0 V | ACTIV15 | 43 | +5 V | +5 V |

The bus signals BIT0 to BIT9, the enabling signals TAG1 to TAG3, the selected unit number signals SELU0 to SELU3, the enabling signals for USTAG, the engaged and selected unit signals BUSY, the revolution pip and sector pip signals INDEX and SECT, the fault signal FAULT, the positioning fault signal SEEKER, the positioning signal ONCYL, the unit-ready signal URDY, the writing prohibited signal WRPTCD, the address mark found signal AMF, the unit selected signal USLCTD and the end of positioning signal SEEKEND correspond to the standard sixty-point interface signals on the normal channel bus. This bus also comprises the previously-mentioned signals NUM0 to NUM3, POUS, PICK, HOLD, OCD, MUL- The bus MSPHY0 to MSPHY3 imposes numbers on the unit multiplexing cards 10 in accordance with the position where they are physically connected to the basket bus 7.

Finally, the basket bus 7 comprises the BLINK signal for blinking the indicator 14 for prohibiting disconnection, the signal ERRT showing a voltage fault on a multiplexing card 10, the STROBE signal synchronising the bus signals and sent to all the unit multiplexing cards 10, and the previously-mentioned signals LOG, DISC and MSPHY0 to MSPHY 3.

The invention can be varied in numerous ways clear to the skilled addressee, inter alia with regard to the practical construction of the various aforementioned logic components.

I claim:

1. A device for connecting a data-processing assembly to a plurality of auxiliary data storage units;

wherein each of the auxiliary data storage units is each connected to the device by a separate control cable and by a separate high transmission speed cable;

wherein the device is connected to the plurality of auxiliary data storage units by a corresponding plurality of separate control cables and by a corresponding plurality of separate high transmission speed cables; and wherein the device is connected to a daisy-chain controller forming a daisy-chain interface of the data processing assembly, the device being connected to the daisy-chain controller by a controller control cable and by a plurality of controller high transmission speed cables;

the device comprising:

means for converting electronic signals conveyed on the controller control cable into a plurality of electronic signals conveyed on the plurality of separate control cables and for converting electronic signals conveyed on each the separate control cable into electronic signals conveyed on the controller control cable, each separate control cable having the same number of signals as, and operating in the same manner as, the controller control cable;

means for rendering the device transparent to information communicated between the plurality of separate high transmission speed cables and the plurality of controller high transmission speed cables; and switching means for electrically connecting and disconnecting the separate control cable and the separate high transmission speed cable of each auxiliary data storage unit to and from the device, so that each auxiliary data storage unit can be connected to and disconnected from the device without interfering with the operation of other of the plurality auxiliary data storage units.

2. The device according to claim 1, further comprising means for remotely controlling the device.

3. The device according to claim 1, further comprising a plurality of visual indicators such that each visual indicator corresponds to a different auxiliary storage unit, which indicators display an activity status of the storage units, the indicators being capable of selectively displaying three conditions.

4. The device according to claim 1, further comprising:

one or more independent data communication channels, each channel including an independent control cable and an independent high transmission speed cable providing an interconnection between the device and external apparatus; and means for electrically connecting or disconnecting any or all the auxiliary data storage units to or from the independent channels without interrupting operation of any other the auxiliary data storage units.

5. The device according to claim 4, wherein the means for electrically connecting and disconnecting the auxiliary storage units to or from the independent channel comprises circuitry which operates only when the storage unit is physically connected to the device.

6. The device according to claim 4, further comprising an independent connection card which provides an interface between the device and an independent communications channel.

7. The device according to claim 6, wherein the independent connection card comprises:

(a) at least one coding wheel capable of selectively assuming a plurality of discrete positions;

(b) a push button actuating switch; and (c) circuitry responsive to the position of the push button, which circuitry, in response to depression of the push button, connects to the independent channel the auxiliary storage unit corresponding to the discrete position assumed by the coding wheel.

8. The device according to claim 1, further comprising recognition means for recognizing a unit multiplexing card physically connected to a given auxiliary storage unit; wherein the recognition means comprises:

(a) a push button;

(b) a coding wheel capable of selectively assuming a plurality of discrete positions, wherein each such discrete position corresponds to a discrete auxiliary storage unit; and (c) a recognition indicator on each unit multiplexing card which is lighted up when the push-button is actuated and when the unit multiplexing card of this recognition indicator is coded on the coding wheel; and wherein the switching means comprises:

(i) a plurality of two-position switches;

(ii) an action push button; and (iii) switching circuitry responsive to the position of the push button, which circuitry enables electrical disconnection or connection of the unit multiplexing card corresponding to one of the two-position switches, wherein the electrical disconnection or connection is accomplished by either cutting off or restoring electric power to transmission and receiving circuits within the unit multiplexing card.

9. A device for connecting a data processing assembly to a plurality of auxiliary data storage units;

wherein each of the auxiliary data storage units is each connected to the device by a separate control cable and by a separate high transmission speed cable;

wherein the device is connected to the plurality of auxiliary data storage units by a corresponding plurality of separate control cables and by a corresponding plurality of separate high transmission speed cables; and wherein the device is connected to a daisy-chain controller forming a daisy-chain interface of the data processing assembly, the device being connected to the daisy-chain controller by a controller control cable and by a plurality of controller high transmission speed cables;

the device comprising:

a plurality of unit multiplexing cards, each of which is connected to an auxiliary data storage unit by the separate control cable and by the separate high transmission speed cable, each unit multiplexing card being connected to a common basket bus; and a bus multiplexing card which controls information conveyed by the common basket bus, the bus multiplexing card being connected to the common basket bus, the daisy-chain controller being connected to the bus multiplexing card by the controller control cable, the daisy-chain controller being operatively connected to each unit multiplexing card of each auxiliary data storage unit by respective controller high transmission speed cables.

10. The device according to claim 9, further comprising a control card connected to the bus multiplexing card and to the daisy-chain controller.

11. The device according to claim 10, further comprising means for recognizing the unit multiplexing card physically connected to a given auxiliary storage unit, the recognition means comprising:
   (a) a push button on the control card;
   (b) a coding wheel connected to the control card, the wheel being capable of selectively assuming a plurality of discrete positions, wherein each such discrete position corresponds to a discrete auxiliary storage unit; and
   (c) a recognition indicator on each unit multiplexing card which is lighted up where the push-button is actuated and when the unit multiplexing card of this recognition indicator is coded on the coding wheel.

12. The device according to claim 10, comprising control means for connecting or disconnecting each auxiliary storage unit to or from the data-processing assembly, the control means comprising:
   (a) a plurality of two-position switches on the control card;
   (b) an action push button on the control card; and
   (c) circuitry responsive to the position of the action push button, which circuitry enables connection or disconnection of the unit multiplexing card corresponding to the two-position switch which has previously been triggered, wherein the connection or disconnection is accomplished by either cutting off or restoring electric power to transmission and receiving circuits within the unit multiplexing card.

13. The device according to claim 9, further comprising:
   (a) means for detecting a fault in an electric power supply; and
   (b) means for detecting a fault in any of the cards.

14. The device according to claim 9, further comprising means for detecting an attempt by two of the storage units to simultaneously access the basket bus, the detection means comprising:
   (a) means for inactivating the logical means for connecting the unit multiplexing cards to the basket bus; and
   (b) means for activating other means for displaying a fault.

15. The device according to claim 9, further comprising an independent connection card which provides an interface between the device and an independent communications channel.

16. The device according to claim 15, wherein the independent connection card comprises:
   (a) at least one coding wheel capable of selectively assuming a plurality of discrete positions;
   (b) a push button actuating switch; and
   (c) circuitry responsive to the position of the push button, which circuitry, in response to depression of the push button, connects to the independent channel the auxiliary storage unit corresponding to the discrete position assumed by the coding wheel.

* * * * *